United States Patent
Hanger et al.

[19]

[11] Patent Number: 5,993,882
[45] Date of Patent: *Nov. 30, 1999

[54] RASPBERRY FLAVORED BEVERAGES

[75] Inventors: Lisa Y. Hanger, Basking Ridge; Robert F. Baron, Three Bridges, both of N.J.

[73] Assignee: Nutrinova, Inc., Somerset, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/771,096

[22] Filed: Dec. 20, 1996

[51] Int. Cl.$^6$ .............................. A23L 1/236; A23L 2/00; A23G 3/00
[52] U.S. Cl. ...................... 426/548; 426/330.5; 426/599; 426/658
[58] Field of Search ................................ 426/548, 330.5, 426/599, 658

[56] References Cited

U.S. PATENT DOCUMENTS 4,158,068   6/1979   Lipinski et al. .......................... 426/548
5,474,791  12/1995   Zablocki et al. .......................... 426/548
5,500,232   3/1996   Keating ..................................... 426/599

OTHER PUBLICATIONS

Ayya et al., "Quantitative and qualitative evaluation of high–intensity sweeteners and sweetener mixtures" *Chem. Senses*, 17:245–249 (1992).

Hanger et al., Descriptive Profiles of Selected High Intensity Sweeteners (HIS), HIS Blends, and Sucrose, *J. Food Sci.*, 61 (2): 456–458 and 464 (1996).

Matysiak et al., Comparison of Temporal Perception of Fruitiness in Model Systems Sweetened with Aspartame, an Asparatame and Acesulfame k Blend, or Sucroes *J. Food Sci.*, 56 (3): 823–826 (1991).

*Primary Examiner*—Anthony J. Weier
*Attorney, Agent, or Firm*—Michael W. Ferrell

[57]   ABSTRACT

A flavored beverage includes a raspberry flavor; as well as a blend of acesulfame potassium with at least one additional sweetener. The dry mix for the beverage has an acid level of between 50 and 75 percent by weight.

4 Claims, 2 Drawing Sheets

RASPBERRY FLAVORED BEVERAGES

FIELD OF THE INVENTION

The invention is directed to a beverage having a raspberry flavor, a sweetener blend of acesulfame potassium and another sweetener, and an acid.

BACKGROUND OF THE INVENTION

High intensity sweeteners (HIS) are known. HIS include, for example, acesulfame potassium, aspartame, cyclamate, saccharin, sucralose, alitame, and neohesperidin dihydrochalone. HIS blends are known. See: U.S. Pat. No. 4,158, 068. HIS blends demonstrate a hyperadditivity (or synergy) as to its sweetness. See: Ayya et al., Quantitative and qualitative evaluation of high intensity sweeteners and sweetener mixtures, *Chem. Senses*, 17: 245–249 (1992); Hanger et al., Descriptive Profiles of Selected High Intensity Sweeteners (HIS), HIS Blends, and Sucrose, *J. Food Sci.*, 61 (2): 456–458 and 464 (1996).

In acidified (pH=3.10) beverage systems, the presence of HIS blends have been associated with enhanced fruitiness scores when using orange flavor and citric acid. See: Matysiak et al., Comparison of Temporal Perception of fruitiness in model systems sweetened with aspartame, an aspartame and acesulfame k blend, or sucrose, *J. Food Sci.* 56 (3): 823–826 (1991). Matysiak et al., reported that an HIS blend (60% aspartame/40% acesulfame potassium) has fruitiness and sweetness durations similar to that of a sucrose sweetened sample.

There is a need in the beverage market to develop formulations with raspberry flavors, HIS blends, and acids that exhibit, among other things, good flavor profiles.

SUMMARY OF THE INVENTION

A flavored beverage comprises: a raspberry flavor; a sweetener blend comprising a blend of acesulfame potassium and the balance being selected from the group consisting of nutritive sweeteners, non-nutritive sweeteners, and combinations thereof; and an acid level of between 50–75% by weight on a dry basis.

DESCRIPTION OF THE DRAWINGS

For the purpose of illustrating the invention, there is shown in the drawings a form which is presently preferred; it being understood, however, that this invention is not limited to that which is shown.

DETAILED DESCRIPTION OF THE INVENTION

A beverage, as used herein, is a carbonated beverage or non-carbonated beverage and may be in a liquid form or a dry form (i.e., to be hydrated later).

A raspberry flavor refers to either a natural or artificial flavor. Such raspberry flavors are comme rcia lly available. Commercial raspberry flavors are available, for example, from International Flavor and Fragrances, Dayton, N.J.; Artificial #13573011 and Natural #K3559549. Commercial raspberry flavors are also available from Tastemaker, Cincinnati, Ohio, and Givaudan Roure, Clifton, N.J.

Sweetener blend refers to a blend of acesulfame potassium and another sweetener. Acesulfame potassium (also referred to as acetosulfame potassium) is commercially available from Hoechst Celanese Corporation, Somerset, N.J. under the tradename "SUNETT". Sweetener refers to nutritive and non-nutritive sweeteners. Nutritive sweeteners include sucrose, glucose, fructose, high fructose corn syrup, and combinations thereof. Non-nutritive sweeteners include aspartame, cyclamate, saccharin, sucralose, alitame and neohesperidin dihydrochalone.

The amount of sweetener in a blend may be expressed by weight percentage of the blend or sweetness contribution. Sweetness contribution refers to the percentage of sweetness (in a product) that an individual sweetener contributes to the total sweetness. For example: a 50/50 blend of acesulfame potassium and aspartame means that 50% of a product's (e.g. a beverage) sweetness comes from acesulfame potassium and 50% from aspartame. Both of those sweeteners are about 200 times sweeter than sucrose; i.e., that 100 grams of sugar would be replaced by a blend having 0.25 grams acesulfame potassium and 0.25 grams aspartame. In another example, the 50/50 blend consists of acesulfame potassium and sucralose (sucralose is 600 times sweeter than sucrose). Thus, to replace 100 grams of sugar, the blend would have 0.25 grams of acesulfame potassium and 0.08 grams sucralose. The relative sweetness of sweeteners to sucrose is known to those of ordinary skill.

A preferred sweetener blend comprises acesulfame potassium and another of the non-nutritive sweeteners. This sweetener blend comprises about 20–50% acesulfame potassium by weight of the blended sweeteners. The most preferred blend comprises 20–50% acesulfame potassium and the balance aspartame.

Acid refers to an ingredient that contributes sourness to the beverage and is added to balance the flavor profile by reducing chemical or sweetener side tastes. Acids may include malic acid, citric acid, phosphoric acid or combinations thereof. Acid level refers to the percentage of acids in the beverage based on the dry weight basis of all ingredients (excluding water). Dry basis refers to all ingredients in the beverage excluding water, i.e., the formulation before reconstitution.

Figure 1:
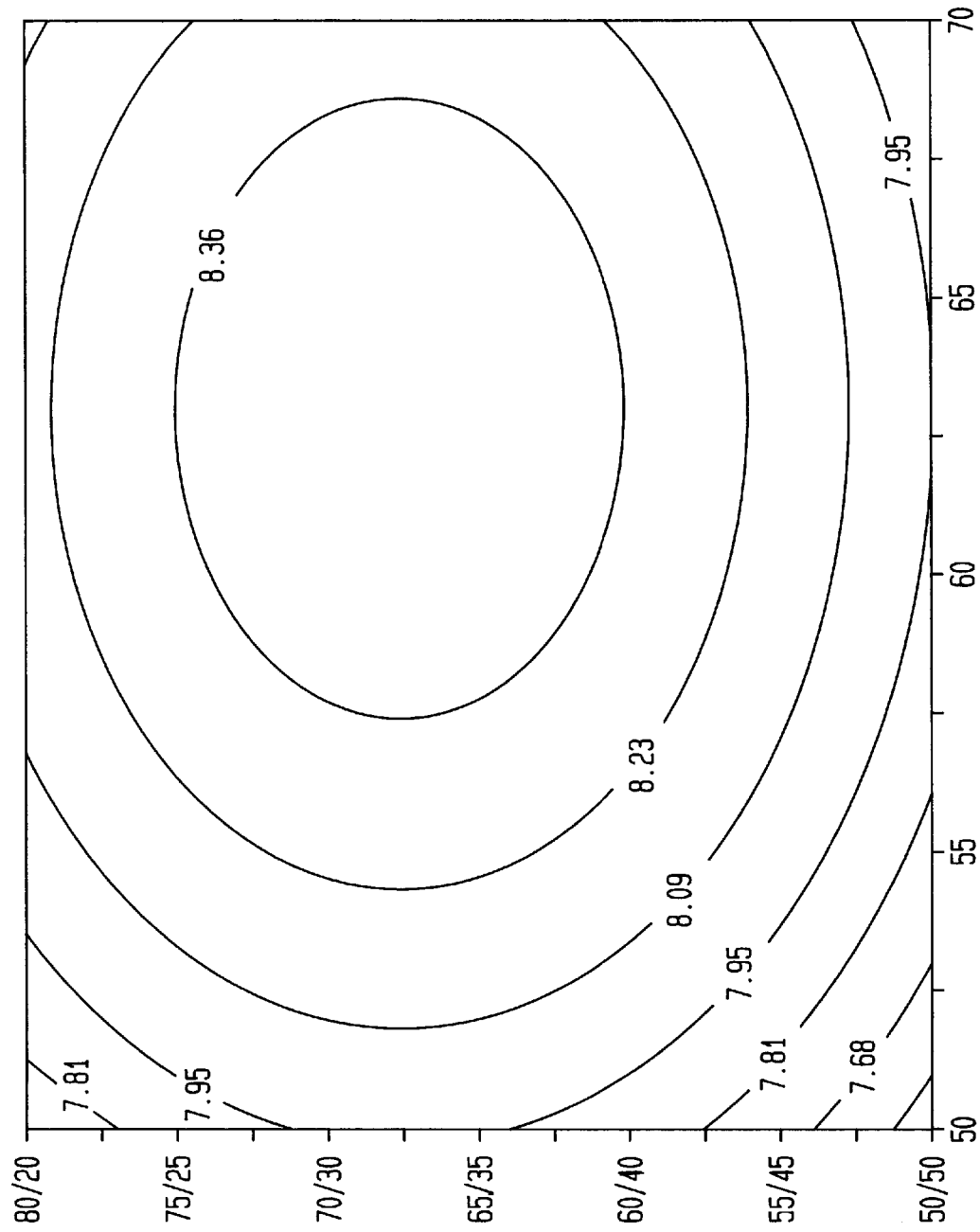
FIG. 1 is a contour plot of raspberry scores by acid level (% weight dry basis abcissa) and sweetener blend (weight ratio aspartame/acesulfame potassium, ordinate) for an artificially flavored beverage.
Figure 2:
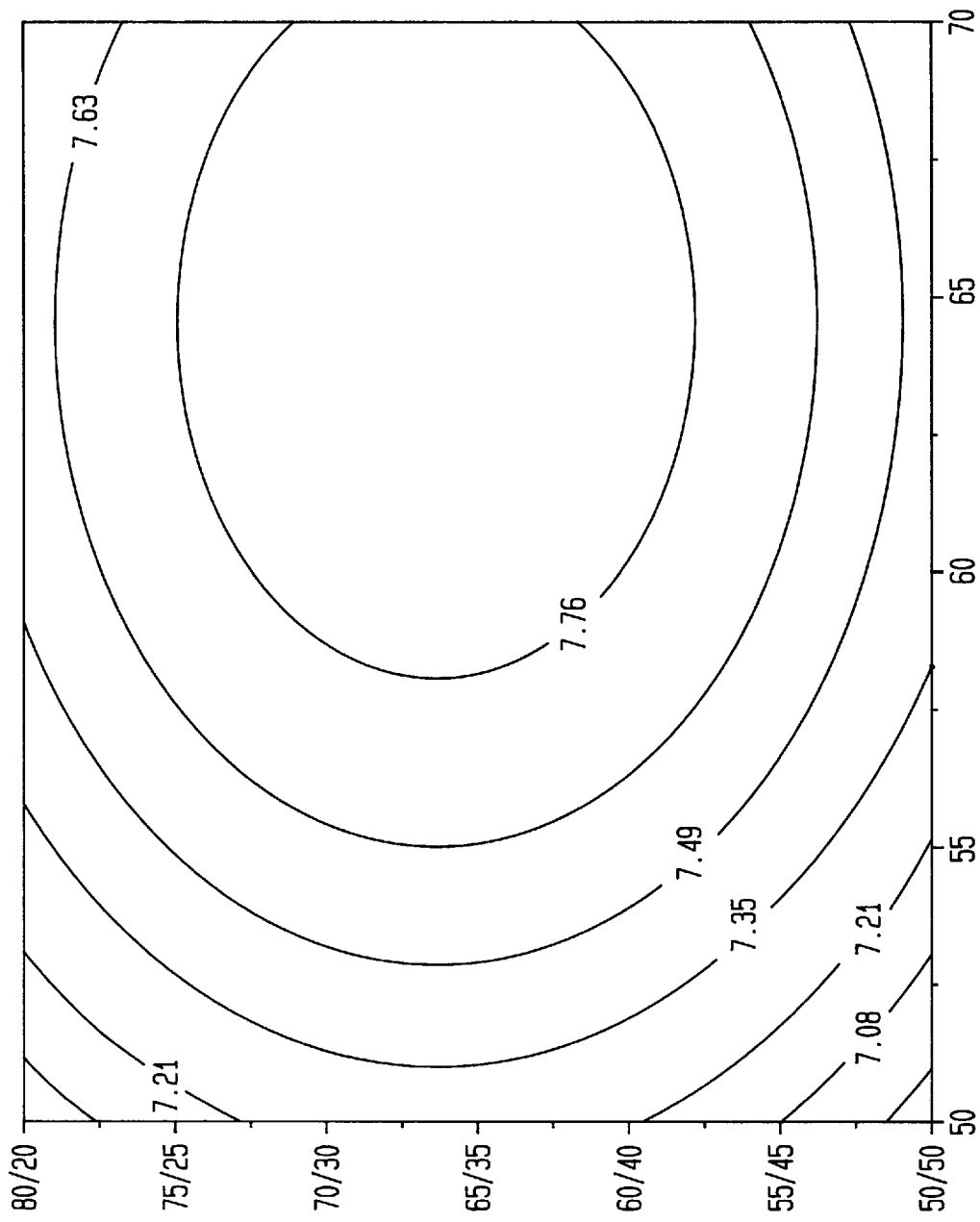
FIG. 2 is a contour plot of raspberry scores by acid level (% weight dry basis, abcissa) and sweetener blend (weight ratio aspartame/acesulfame potassium, ordinate) for a naturally flavored beverage.

Optimum raspberry beverages are defined as having higher raspberry scores, balanced sweetness and sour levels, and low chemical side tastes. The beverage includes raspberry flavor, a sweetener blend of 20–50% weight of the blend of acesulfame potassium, and an acid level of between 50–75% by weight on a dry basis. In an artificially flavored raspberry beverage, the raspberry flavor intensity varies with sweetener blend ratio and acid level as shown in FIG. 1. In a naturally flavored raspberry beverage, the raspberry flavor intensity varies with sweetener blend ratio and acid level as shown in FIG. 2.

A preferred artificially flavored raspberry beverage contains 56–68% by weight on a dry basis of acid with an aspartame/acesulfame potassium blend from 50/50 to 80/20. A more preferred artificially flavored raspberry beverage contains 56.7–60% acid with an aspartame/acesulfame potassium blend from 65/35 to 80/20. A preferred naturally flavored raspberry beverage contains 58–70% acid with an aspartame/acesulfame potassium blend from 60/40 to 75/25.

All weight percentages are presented on a dry basis, except as noted and for the sweetener blends ratios.

Example

Beverage Formulation

Raspberry flavored powdered beverages were formulated with natural and artificial flavor types varying aspartame and acesulfame potassium blend ratios (80/20–50/50 sweetness contribution), and varying acid levels (50–70% dry basis). See Table 1. Sweetener blends (ppm) were verified equi-sweet to an 8.0% sucrose solution in water before incorporation into the formulation because acid levels are theorized to affect sweetness levels.

The base beverage was prepared by mixing, for about 15 minutes, 33.0% sodium citrate (ADM, Decatur, Ill.), 16.5% sodium chloride (Mallinckrodt, Paris, K.Y.), 8.3 tricalcium phosphate (Rhone Poulenc, Shelton, Conn.), 4.2% ascorbic acid, a vitamin (Merck, Darmstadt, Germany), 13.1% FD&C Red #40 (Warner Jenkinson, St. Louis, Mo.), 0.2% FD&C Blue #1 (Warner Jenkinson, St. Louis, Mo.), and 24.7% raspberry flavor (International Flavors and Fragrances, Dayton, N.J.; Artificial—#13573011, Natural—#K3559549) in a twin-shell cantilevered liquid-solids blender-granulator with an intensifier attachment (Patterson-Kelley, East Stroudsburg, Pa.). Separate base beverages were prepared for each of the flavor types (natural and artificial). The base beverages were portioned into amounts that would prepare 1000 ml of beverage. Sweeteners (Acesulfame potassium—Sunett® Brand Sweetener—Hoechst Food Ingredients, Somerset, N.J. and aspartame—Holland Sweetener, Atlanta, Ga.) and malic acid (Bartec Ingredients Inc., Ontario, Canada) were added to each portion. Acid percentages (dry basis) were chosen to encompass pH levels in the finished beverages of 2.0–3.5. Final beverage formulations are presented in Table 1.

The two phase blending approach was used to ensure accurate levels of acid and sweetener in the final beverages. Room temperature spring water (American Eagle, Harwick, N.J.) was added to the base/sweetener/acid mixture (dry-mix) to a volume of 1000 ml. Beverages were mixed 10–15 minutes using a magnetic stirring plate. Samples were prepared 12–14 hours before descriptive testing and stored at 7° C. Additionally, an anchor beverage was formulated (Table 1) to be similar to current sugar-free raspberry beverages and was sweetened with 400 ppm aspartame. The anchor beverage was used by the panelists as an anchor point of reference during evaluation. Natural flavor was used in the anchor beverage because naturally flavored beverages showed more distinct profile differences during ballot development.

Taste Testing

Six previously trained descriptive panelists (5 female, 1 male age 37–53) participated in eight orientation/ballot development sessions. During these sessions, panelists generated characteristics to describe the sample set. During subsequent sessions practice with references and products was conducted to determine the final ballot. Final terms included on the ballot were raspberry, sweet, chemical, sour, bitter, astringency, salivation, mouth drying, throat catch, and immediate chemical aftertaste. See: Table 2. Standard references (Meilgaard et al., *Sensory Evaluation Techniques*. CRC Press Inc., Boca Raton, Fla. 1990) for flavor (universal scale) and taste (basic) attributes were used.

Panelists evaluated six (40 ml) samples per 2 hour session for 8 sessions. Attributes were scored using a 15 cm unstructured line scale. The steps in each evaluation session included reference review, anchor sample review and evaluation of experimental samples. Panelists cleared the palate between samples with unsalted crackers and spring water. A 10 minute rest period was used between samples.

The anchor sample was evaluated by the panel prior to data collection and general consensus scores for each descriptive attribute. These consensus scores were marked on the ballot for reference by the panelists. During the data collection, phase, the sample was tasted before each experimental sample and used along with reference standards for anchoring attributers on the scale.

A randomized complete block design was used for sensory testing with session as a block. Three replications of each design point were completed.

Analysis of Data Taste Testing

The scores were first analyzed using the General Linear Model (GLM) in SAS® (SAS Institute, Cary, N.C.) with panelists, acid level, sweetener blend, and flavor type included as the main effects. Additionally, separate analyses were run for natural and artificial flavor samples. MODDE (Umetri, UMEA, Sweden) was used to map the experiment using Response Surface Modeling (RSM).

Results

The result of the foregoing are set forth in Tables 3 and 4.

The present invention may be embodied in other specific forms without departing from the spirit or essential attributes thereof and, accordingly, reference should be made to the appended claims rather than to the foregoing specification, as indicating the scope of the invention.

TABLE 1

Raspberry beverage formulations[a]

(All % are by weight of the beverage)

| Blend ratio (aspartame/acesulfame-k) | Acid Level (% dry basis) | Flavor Type Natural/Artificial[c] | Base % | Acid % | Acesulfame Potassium % | Aspartame % | Water % |
|---|---|---|---|---|---|---|---|
| 50/50 | 50 | N,A | 0.120 | 0.15 | 0.013 | 0.013 | 99.71 |
| 50/50 | 70 | N,A | 0.120 | 0.34 | 0.013 | 0.013 | 99.52 |
| 60/40 | 50 | N,A | 0.120 | 0.15 | 0.011 | 0.016 | 99.71 |
| 60/40 | 70 | N | 0.120 | 0.34 | 0.011 | 0.016 | 99.51 |
| 65/35 | 60 | N,A | 0.120 | 0.27 | 0.009 | 0.017 | 99.58 |
| 70/30 | 50 | N | 0.120 | 0.15 | 0.008 | 0.019 | 99.71 |
| 70/30 | 70 | A | 0.120 | 0.35 | 0.008 | 0.019 | 99.51 |
| 80/20 | 50 | N,A | 0.120 | 0.15 | 0.005 | 0.022 | 99.71 |
| 80/20 | 56.7 | A | 0.120 | 0.19 | 0.005 | 0.022 | 99.66 |

TABLE 1-continued

Raspberry beverage formulations[a]
(All % are by weight of the beverage)

| Blend ratio (aspartame/acesulfame-k) | Acid Level (% dry basis) | Flavor Type Natural/Artificial[c] | Base % | Acid % | Acesulfame Potassium % | Aspartame % | Water % |
|---|---|---|---|---|---|---|---|
| 80/20 | 70 | N,A | 0.120 | 0.34 | 0.005 | 0.022 | 99.51 |
| 80/20 | 63.3 | N | 0.120 | 0.25 | 0.005 | 0.022 | 99.60 |
| Anchor (Aspartame) | 60 | N | 0.120 | 0.29 | 0.000 | 0.040 | 99.54 |

[a]Basic formulations were used for both natural and artificially flavored samples
[b]Blend ratios are presented as contribution to sweetness assuming acesulfame-k and APM are 200 times sweeter than sucrose.
[c]N = Natural, A = Artificial

TABLE 2

| Term | Definition | Reference |
|---|---|---|
| Raspberry | The aromatic associated with candied raspberries. | Red Raspberry Juicefuls ® Candy |
| Sweet | The basic taste associated with sucrose. | Sucrose in water at various concentrations 2.0% = 2, 5.0% = 5, 10.0% = 10 |
| Chemical | The general perception of a chemical characteristic, giving a "flat" taste, does not include medicinal or antiseptic | 0.25 gram of saccharin in 500 ml of water = 8 |
| Sour | The basic taste associated with citric acid. | Citric acid in water at various concentrations 0.50 g/L = 2, 0.80 g/L = 5, 1.5 g/L = 10, 2.0 g/L = 15.0 |
| Bitter | The basic taste associated with caffeine | Caffeine in water at various concentrations 0.225 g/L = 2, 0.55 g/L = 5.0, 1.1 g/L = 10, 1.75 g/L = 15 |
| Astringency | The combination of sensations, dominated by a dry mouth, teeth coating, furry tongue, and some puckering. | Alum 0.50 g in 500 ml of water = 6 1.0 g in 500 ml of water = 10 |
| Salivation | The flooding of the mouth with saliva | Fresh lemon wedge Suck on flesh part for 5 sec = 15 |
| Mouth Drying | The sensation of a dry mouth | Cranberry Juice Cocktail (1–2 minutes after swallowing) |
| Throat Catch | The feeling that the throat needs to be cleared | Lemon juice 10 ml in 100 ml of water. |
| Immediate Chemical Aftertaste | Chemical perception immediately after swallowing | N/A |

TABLE 3

Means[1] ± standard deviations of descriptive attributes of artificially flavored raspberry beverages by blend ratio and acid level[2]

| Aspartame/Acesulfame Potassium Blend Ratio | Acid % (Dry Basis) | Raspberry | Sweet | Chemical | Sour | Astringency |
|---|---|---|---|---|---|---|
| 50/50 | 50 | 7.5 ± 0.9[bc] | 8.3 ± 1.3[a] | 3.0 ± 0.9[a] | 2.2 ± 0.4[c] | 1.7 ± 1.2[b] |
| 50/50 | 70 | 8.0 ± 0.6[abc] | 8.1 ± 1.0[a] | 3.0 ± 0.8[a] | 3.7 ± 0.8[a] | 3.0 ± 0.4[a] |
| 60/40 | 50 | 7.8 ± 1.1[abc] | 8.8 ± 1.4[a] | 3.3 ± 0.8[a] | 2.4 ± 0.5[c] | 1.5 ± 1.3[b] |
| 65/35 | 60 | 8.6 ± 0.8[a] | 8.6 ± 0.9[a] | 3.6 ± 1.1[a] | 3.6 ± 1.0[a] | 2.6 ± 0.9[a] |
| 70/30 | 70 | 8.2 ± 0.5[ab] | 8.2 ± 0.9[a] | 2.9 ± 0.5[a] | 3.5 ± 0.7[a] | 2.8 ± 0.5[a] |
| 80/20 | 50 | 7.5 ± 1.1[c] | 8.3 ± 1.4[a] | 3.0 ± 0.7[a] | 2.3 ± 0.5[c] | 2.2 ± 1.1[ab] |
| 80/20 | 56.7 | 8.4 ± 0.6[a] | 8.7 ± 1.2[a] | 3.0 ± 0.6[a] | 2.8 ± 0.6[bc] | 2.2 ± 1.0[ab] |
| 80/20 | 70 | 7.9 ± 0.8[abc] | 7.9 ± 0.9[a] | 2.8 ± 0.8[a] | 3.5 ± 0.6[ab] | 2.9 ± 0.5[a] |

[1]15 cm line scale, n = 18; Means within columns followed by like letters are not significantly different (p < 0.05)

TABLE 4

Means[1] ± standard deviations of descriptive scores of naturally flavored raspberry beverages by blend ratio and acid levels

| Aspartame/Acesulfame-k Blend Ratio | Acid % (Dry Basis) | Raspberry | Sweet | Chemical | Sour | Astringency |
|---|---|---|---|---|---|---|
| 50/50 | 50 | 6.7 ± 1.4[b] | 8.6 ± 1.0[ab] | 3.2 ± 1.1[a] | 2.5 ± 0.6[c] | 1.6 ± 1.2[b] |
| 50150 | 70 | 7.3 ± 0.9[ab] | 7.7 ± 0.9[c] | 3.2 ± 0.7[a] | 3.4 ± 0.7[ab] | 3.0 ± 0.5[a] |
| 60/40 | 70 | 7.8 ± 1.1[a] | 7.7 ± 1.6[c] | 2.8 ± 1.0[a] | 3.7 ± 0.9[a] | 2.8 ± 0.5[a] |
| 65/35 | 60 | 7.5 ± 1.1[ab] | 8.3 ± 0.7[abc] | 3.1 ± 0.7[a] | 3.2 ± 0.7[ab] | 2.5 ± 0.7[a] |
| 70/30 | 50 | 7.5 ± 1.4[ab] | 8.8 ± 0.6[a] | 3.1 ± 0.8[a] | 2.5 ± 0.6[c] | 2.2 ± 0.9[ab] |
| 80/20 | 50 | 6.8 ± 1.4[ab] | 8.6 ± 1.1[abc] | 3.3 ± 1.0[a] | 2.3 ± 0.3[c] | 2.3 ± 1.1[ab] |
| 80/20 | 63.3 | 7.7 ± 0.7[ab] | 8.0 ± 0.8[abc] | 3.2 ± 0.6[a] | 2.9 ± 0.5[bc] | 2.5 ± 0.7[a] |

TABLE 4-continued

Means[1] ± standard deviations of descriptive scores of naturally flavored raspberry beverages by blend ratio and acid levels

| Aspartame/Acesulfame-k Blend Ratio | Acid % (Dry Basis) | Raspberry | Sweet | Chemical | Sour | Astringency |
|---|---|---|---|---|---|---|
| 80/20 | 70 | 7.5 ± 0.9[ab] | 7.9 ± 0.8[bc] | 2.9 ± 0.8[a] | 3.7 ± 0.7[a] | 2.8 ± 0.4[a] |
| Control (Aspartame) | 60 | 7.6 | 7.5 | 3.5 | 3.4 | 2.6 |

[1]15 cm line scale, n = 18; Means within columns followed by like letters are not significantly different ($p < 0.05$)

We claim:

1. A flavored beverage consisting essentially of:
   (a) an artificial raspberry flavor;
   a sweetener blend comprising a blend of acesulfame potassium and aspartame wherein acesulfame potassium comprises 20–50% by weight of said sweetener blend and an acid level of between 56–68% by weight on a dry basis.

2. The beverage according to claim 1 wherein said acid being malic acid.

3. A flavored beverage consisting essentially of:
   a natural raspberry flavor;
   a sweetener blend comprising a blend of acesulfame potassium and aspartame wherein the ratio of aspartame to acesulfame potassium is 80/20 to 50/50; and
   an acid level of 58–70% by weight on a dry basis.

4. The beverage according to claim 3 wherein said sweetener blend comprises 75/25–60/40 of aspartame/acesulfame potassium.

* * * * *